(12) United States Patent
Cote (10) Patent No.: US 11,185,054 B2
(45) Date of Patent: Nov. 30, 2021

(54) BIRD FEEDER WITH REMOVABLE BASE

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 91 days.

(21) Appl. No.: 15/932,980

(22) Filed: Jun. 1, 2018

(65) Prior Publication Data

US 2019/0364852 A1    Dec. 5, 2019

(51) Int. Cl.
*A01K 39/01*    (2006.01)
*A01K 39/012*    (2006.01)

(52) U.S. Cl.
CPC ............ *A01K 39/012* (2013.01); *A01K 39/01* (2013.01); *A01K 39/0113* (2013.01)

(58) Field of Classification Search
CPC ............................. A01K 39/01; A01K 39/0113
USPC ............... 119/52.2, 52.3, 57.8, 57.9
See application file for complete search history.

(56) References Cited

U.S. PATENT DOCUMENTS

| | | | | |
|---|---|---|---|---|
| 5,720,238 A * | 2/1998 | Drakos | ............. | A01K 39/0113 119/57.9 |
| 5,964,183 A * | 10/1999 | Czipri | ................. | A01K 39/012 119/52.3 |
| 6,543,384 B2 * | 4/2003 | Cote | .................. | A01K 39/0113 119/57.9 |
| 6,945,192 B2 * | 9/2005 | Cote | .................. | A01K 39/0113 119/57.9 |
| 8,230,809 B2 * | 7/2012 | Cote | .................. | A01K 39/0113 119/52.3 |
| 9,609,852 B2 * | 4/2017 | Cote | .................. | A01K 39/0113 |
| 2014/0251220 A1 * | 9/2014 | King | ..................... | A01K 39/01 119/53 |

* cited by examiner

*Primary Examiner* — David J Parsley
(74) *Attorney, Agent, or Firm* — Andrews Robichaud PC; Alessandro Colonnier (57) ABSTRACT

A bird feeder comprising a seed tube having an open top end and an open lower end, a cover arranged to sit on top of the open top end of the seed tube, the cover being removably attached to the seed tube, a seed tube base removably attached to the open lower end, the seed tube base having a bottom wall and a circular side wall with a plurality of feed openings in the circular wall, a shroud extending around the seed tube base, the shroud having shroud feed openings therein which are normally aligned with the feed openings in the circular side wall of the seed tube base, the shroud moving to a position wherein the shroud feed openings and the feed openings in the circular side wall of the seed tube base are out of alignment when a weight above a predetermined amount is present on the shroud.

8 Claims, 13 Drawing Sheets

BIRD FEEDER WITH REMOVABLE BASE

The present invention is related to U.S. application Ser. No. 15/932,468 filed Mar. 2, 2018 and U.S. application Ser. No. 15/932,724 filed Apr. 12, 2018, the contents of which are hereby incorporated by reference.

FIELD OF THE INVENTION

The present invention relates to bird feeders and more particularly, relates to a bird feeder which provides for easy cleaning thereof.

BACKGROUND OF THE INVENTION

Bird feeders are very popular and basically comprise a container which will supply seeds or other bird food to the birds. Feeding of the birds is frequently used for bird watching and the bird feeder and food placed therein can be tailored to attracting certain species of birds.

Seed feeders are the most popular type and many different designs are known in the art. Thus, one can use trays or hoppers or tubes to supply the seeds to the birds. Sunflower seeds are frequently used as these are popular to attract birds such as chickadees, finches, cardinals and the like.

It is widely known in the art to utilize squirrel resistant feeders in order to try to deter the squirrels from eating the seeds. Many different mechanisms have been utilized with one of the more popular being a weight sensitive technology which denies access to the seed when a weight above a certain predetermined amount is present at the feeder. The use of baffles on poles and the like is also known. Other mechanisms include surrounding the feeder with a metal cage to limit access to the seed holder due to the size of the openings in the cage. Other feeders are utilized for specific species of birds such as hummingbird feeders, oriole feeders, suet feeders and the like.

One problem common to most bird feeders is the risk of spreading disease due to poorly maintained feed stations. The combination of moisture and seeds can result in the seeds becoming moldy or rancid. In order to overcome this problem, the feeders must be cleaned at a regular interval. However, many designs of feeders are such that access to the moldy feed and cleaning of the container is difficult. This is particularly so when the feeder is of the tube type and even more so when squirrel resistant features are incorporated in the feeder.

SUMMARY OF THE INVENTION

It is an object of the present invention to provide a bird feeder of the squirrel resistant type and which feeder has a seed container which can be accessed and can be easily cleaned by the average person.

According to one aspect of the present invention, there is provided a bird feeder comprising a seed tube, the seed tube having an open top end and an open lower end, a cover arranged to sit on top of the open top end of the seed tube, the cover being removably attached to the seed tube, a seed tube base removably attached to the open lower end, the seed tube base having a bottom wall and a circular side wall, a plurality of feed openings in the circular side wall, a shroud extending around the seed tube base, the shroud having shroud feed openings therein, the shroud feed openings being normally aligned with the feed openings in the circular side wall of the seed tube base, the shroud moving to a position wherein the shroud feed openings and the feed openings in the circular side wall of the seed tube base are out of alignment when a weight above a predetermined amount is present on the shroud.

The bird feeder, as above mentioned, includes a seed tube which has an open top end and an open lower end. The seed tube is preferably cylindrical in configuration and may be formed of any suitable material, with a preferred material being a transparent plastic material to provide visual access to the container interior and thereby show the seed level.

The cover is designed to fit on top of the open top end of the seed tube. The cover is removably attached to the seed tube and many different arrangements may be provided. In a preferred embodiment, the cover is rotatable with respect to the seed tube and may be moved between a secured and unsecured position. Although the top of the seed tube could provide such an arrangement, a preferred embodiment will utilize a top which will be in a locking/unlocking relationship with the cover.

The present invention will utilize a seed tube base which is removably attached to the open lower end. This provides a distinct advantage for cleaning purposes since most of the problem with spoilage of the seed will occur at the bottom of the seed tube where moisture may accumulate. Thus, being able to remove the base and thoroughly clean the same presents a distinct advantage. The seed tube base could be immersed in a cleaning solution or placed in a dishwasher to ensure disinfection.

In the preferred embodiment of the present invention, the bird feeder will have a funnel member which is secured to the seed tube and which funnel member will be removably secured to the seed tube base. Although many different attachment methods may be utilized, a screwthreaded arrangement is convenient.

BRIEF DESCRIPTION OF THE DRAWINGS

Having thus generally described the invention, reference will be made to the accompanying drawings, in which.

DETAILED DESCRIPTION OF THE INVENTION

Referring to the drawings in greater detail and by reference characters thereto, there is illustrated a bird feeder which is generally designated by reference numeral 10.

Bird feeder 10 has a seed tube generally designated by reference numeral 12. A cover 10 is designed to fit over an upper end of the seed tube. A hanger generally designated by reference numeral 16 is utilized to hang bird feeder 10 from any suitable support member.

Bird feeder 10 also includes a funnel 18 and a seed tube base 20. A shroud 22 extends about seed tube base 20 and funnel 18 as will be described in greater detail hereinbelow.

Seed tube 12 is defined by a tubular wall 24 which has an open top 26 and an open bottom 28. There are a plurality of apertures 30 formed in the tubular wall 24 near open bottom 28.

Figure 10:
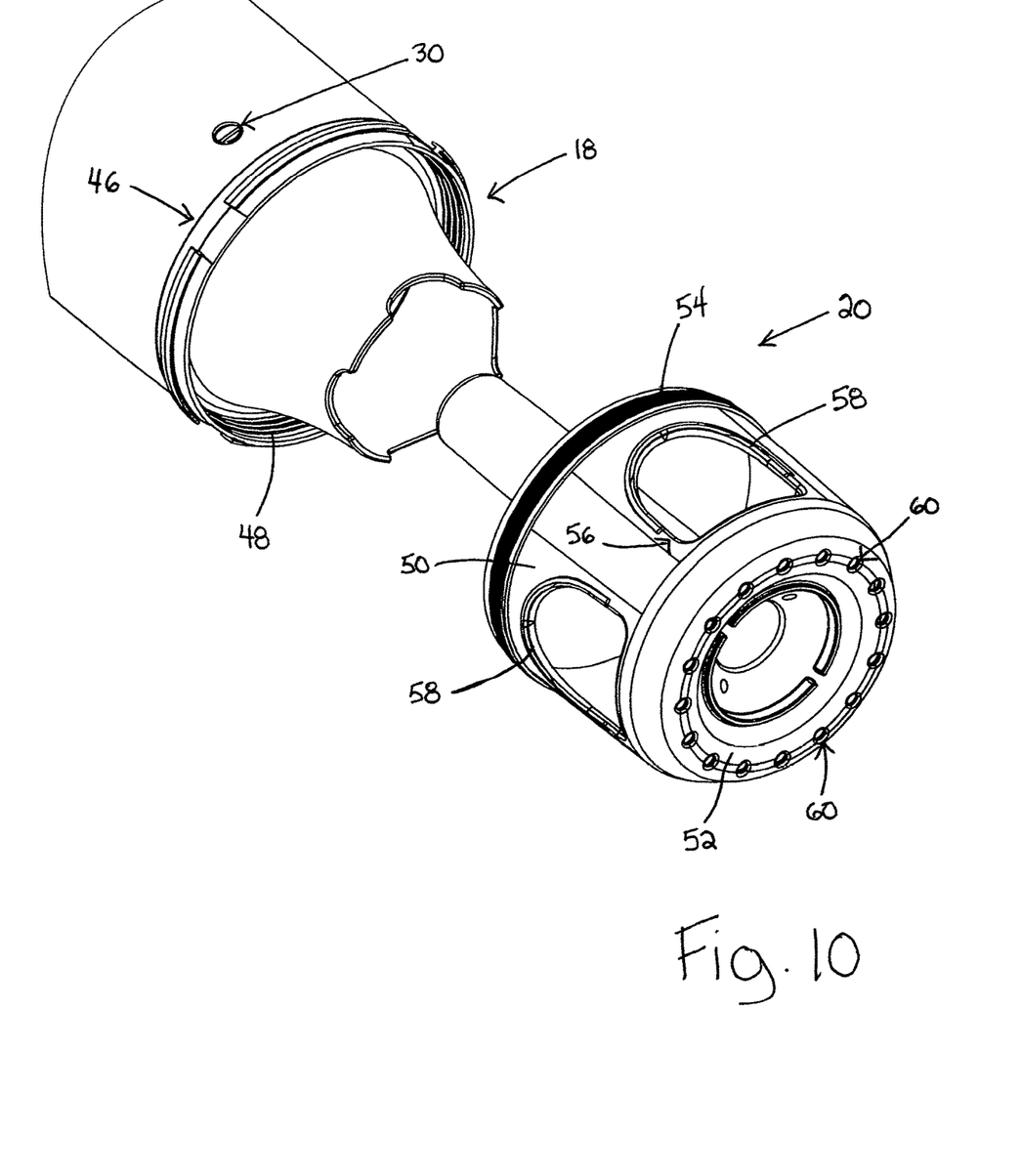
FIG. 10 is a perspective exploded view of the bottom portion of the seed tube.
Figure 11:
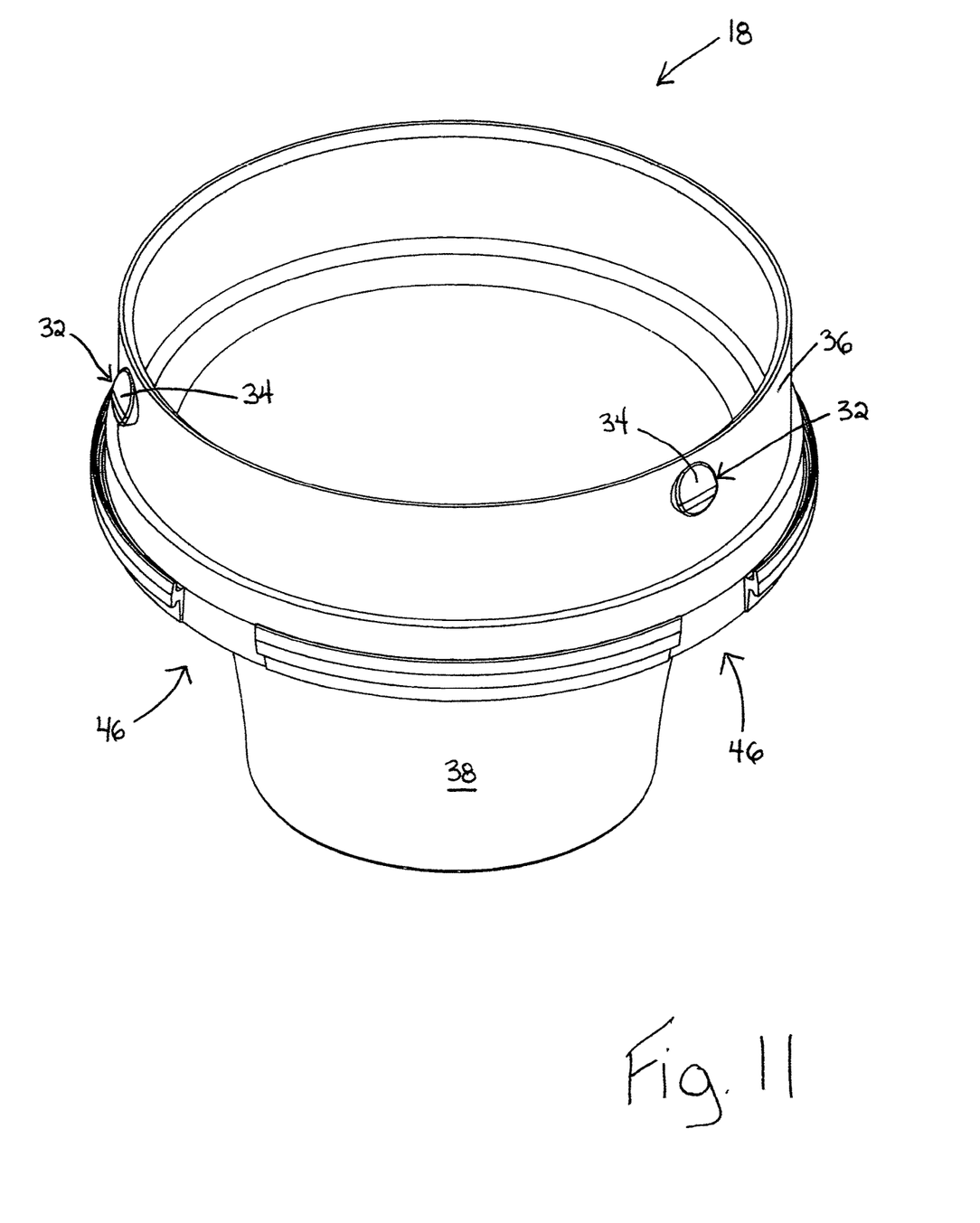
FIG. 11 is a perspective view of the funnel portion of the bird feeder.
Figure 12:
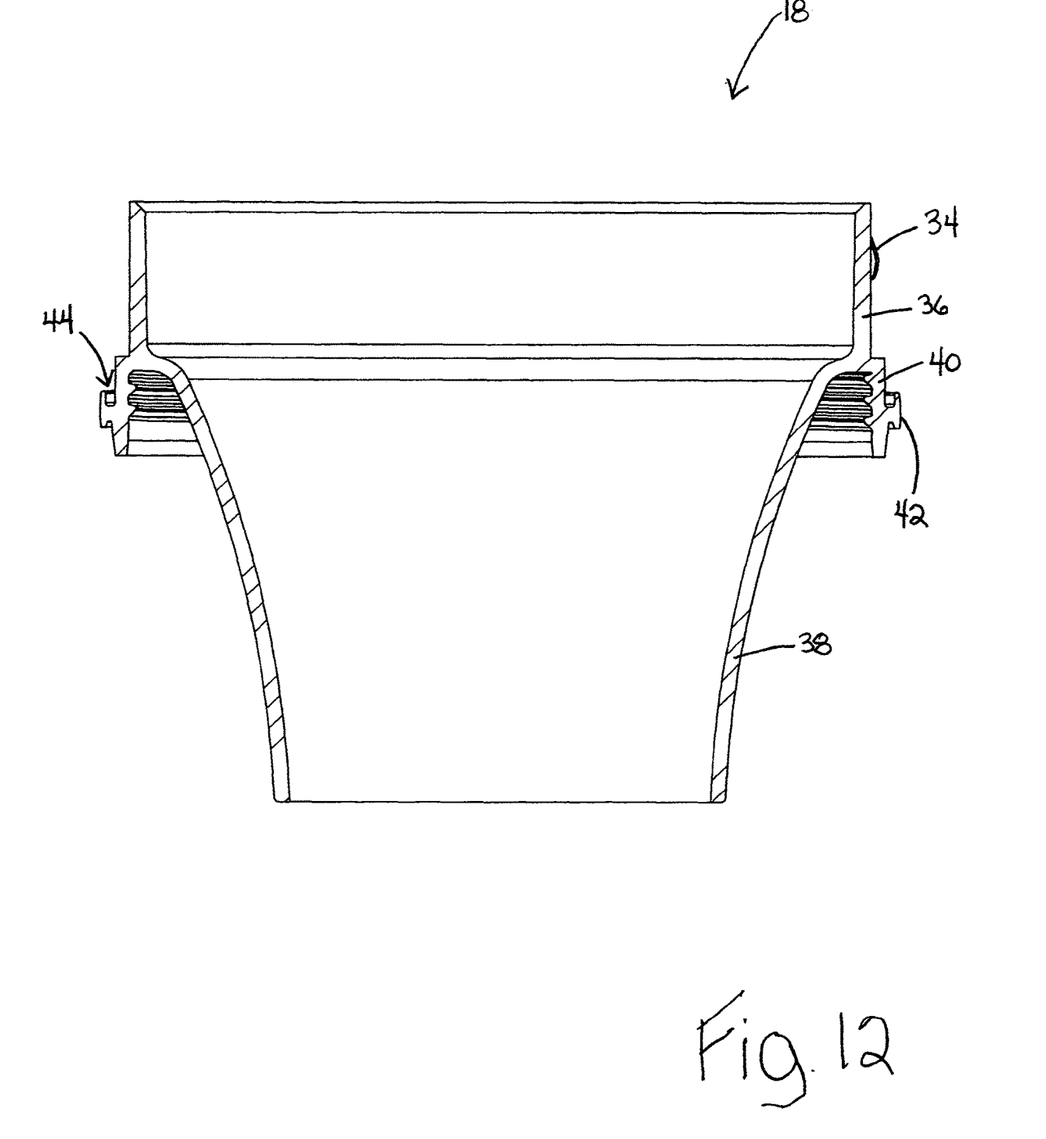
FIG. 12 is a sectional view of the funnel portion of the bird feeder.
Figure 13:
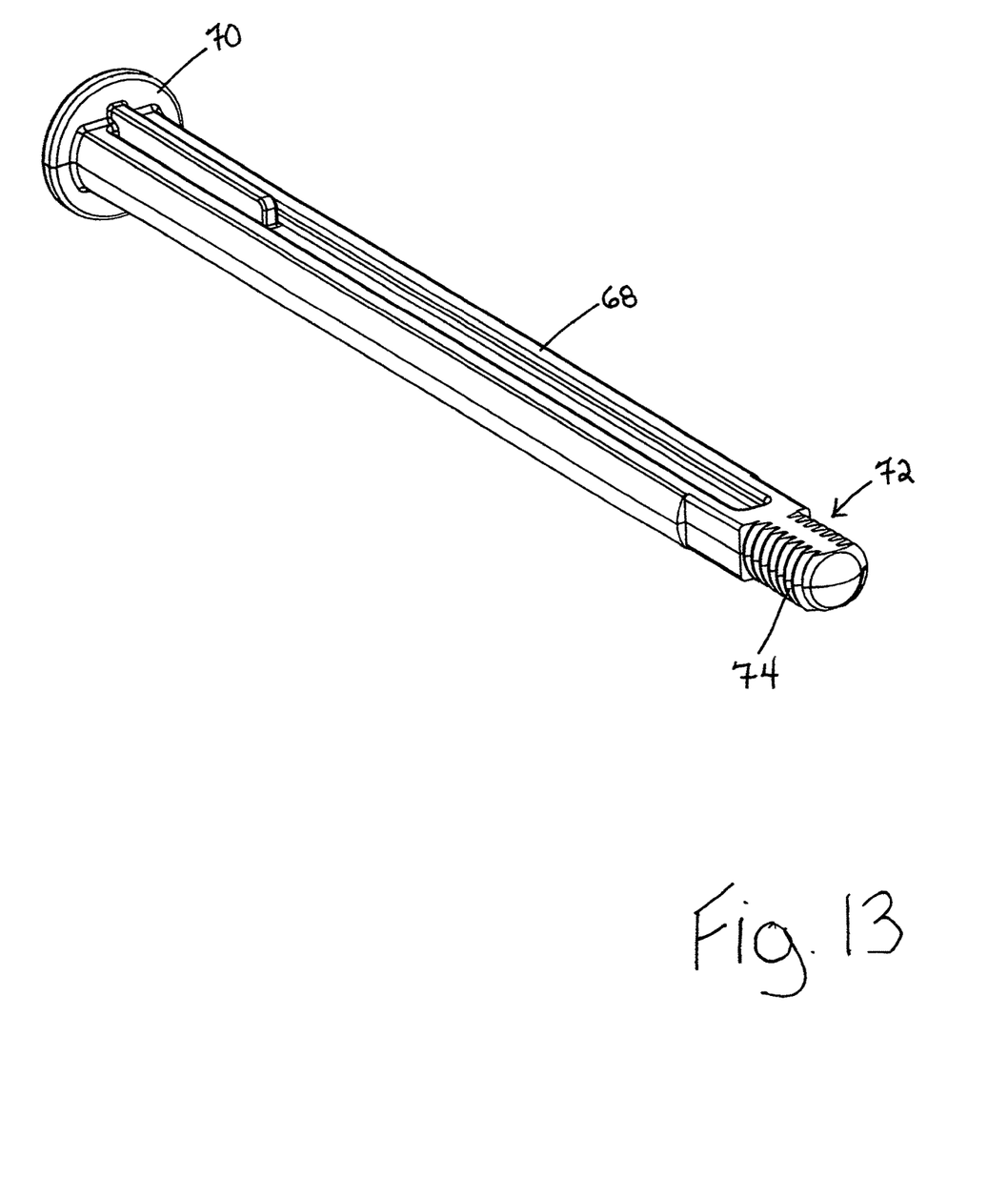
FIG. 13 is perspective view of a rod member used with the spring mechanism.

Funnel 18 (as seen in FIGS. 10 to 12) has an upper wall 36 and a lower tapered wall 38. On upper wall 36, there are formed a plurality of protrusions 32 which are designed to engage with apertures 30 in tubular wall 24 to secure the tube members together. It will be noted that protrusions 32 have an angled front face 34 to assist in engaging protrusions 32 with apertures 30.

A center wall 40 is provided between upper wall 36 and lower tapered wall 38; center wall 40 is in the form of a flange and has a rain diverter 42 formed thereon. Rain diverter 42 has a channel 44 to receive any water flowing downwardly from tubular wall 24 to divert the water to drip areas 46 which are formed intermediate sections of rain diverter 42. A plurality of screwthreads 48 are formed interiorly of center wall 40.

Seed tube base 20 has a side wall 50 and a bottom wall 52. Screwthreads 54 are formed on an exterior surface of an upper portion of side wall 50 and are designed to engage with screwthreads 48 of funnel 18 to secure the members together. A plurality of feed access openings 56 are formed in side wall 50 with a rim 58 formed along an upper portion surrounding the feed access openings 56. Bottom wall 52 has a plurality of bottom draining apertures 60 formed therein.

Located inwardly of seed tube base 20 is a longitudinally extending post generally designated by reference 62. Post 62 is formed on a cylindrical wall 64 which has a top wall 66. Located internally of post 62 is a rod 68. Rod 68 has flange 70 formed at a top end thereof while a lower portion 72 has screwthreads 74 formed thereon. Extending about rod 68 is coil spring 76 which has a first end biased against top flange 70. A base member 78 is provided and is connected to seed tube base 20 by means of screws 79. At one end of rod 68 carrying the screwthreads 74, there is provided a cap 80 which is screwthreadedly engaged with screwthreads 74.

Shroud 22 has an upper side wall 82 and a baffle 84 formed integrally therewith. A lower side wall 86 has a plurality of feed openings 88 formed therein. Feed openings 88 are designed to normally align with feed access openings 56 in seed tube base 20.

Figure 1:
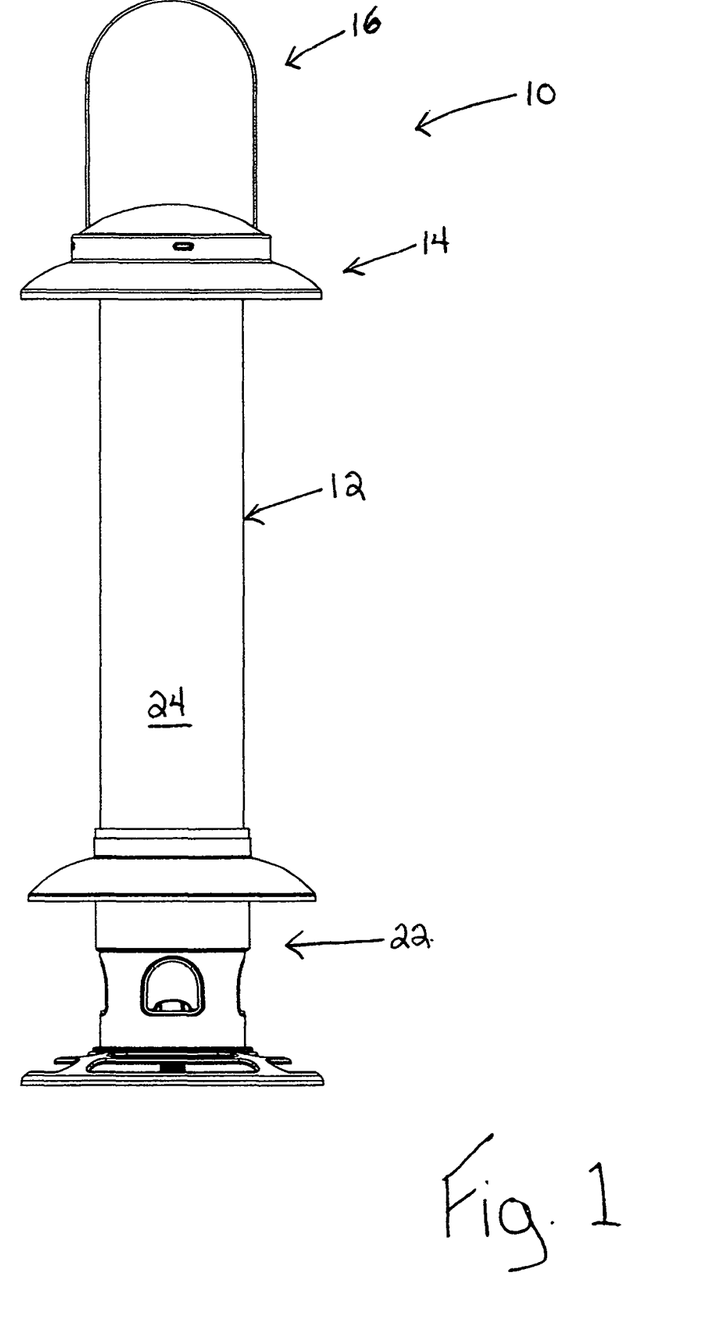
FIG. 1 is a side elevational view of a bird feeder according to one embodiment of the present invention.
Figure 2:
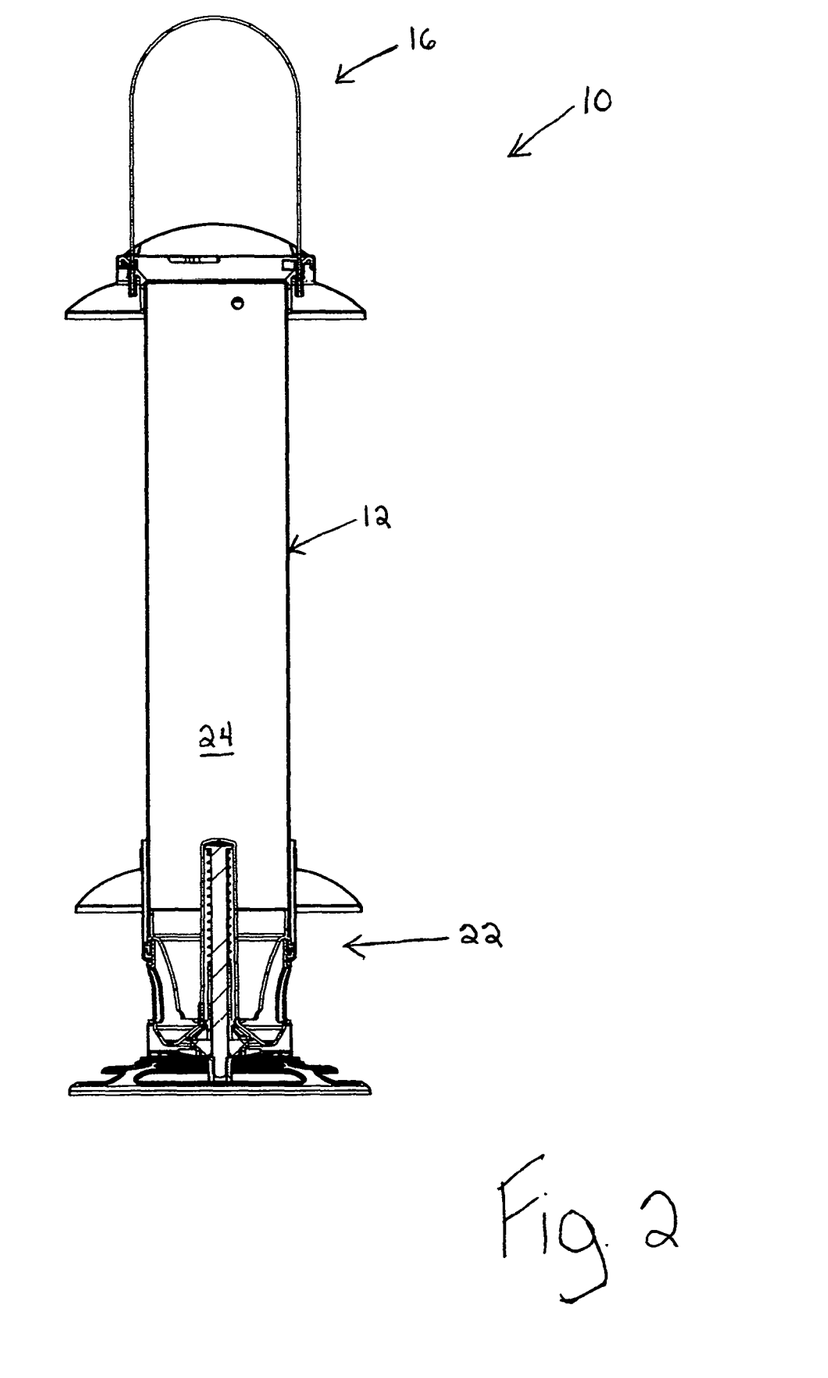
FIG. 2 is an enlarged cross-sectional view of the lower portion of the bird feeder when access to the seed tube is permitted.
Figure 3:
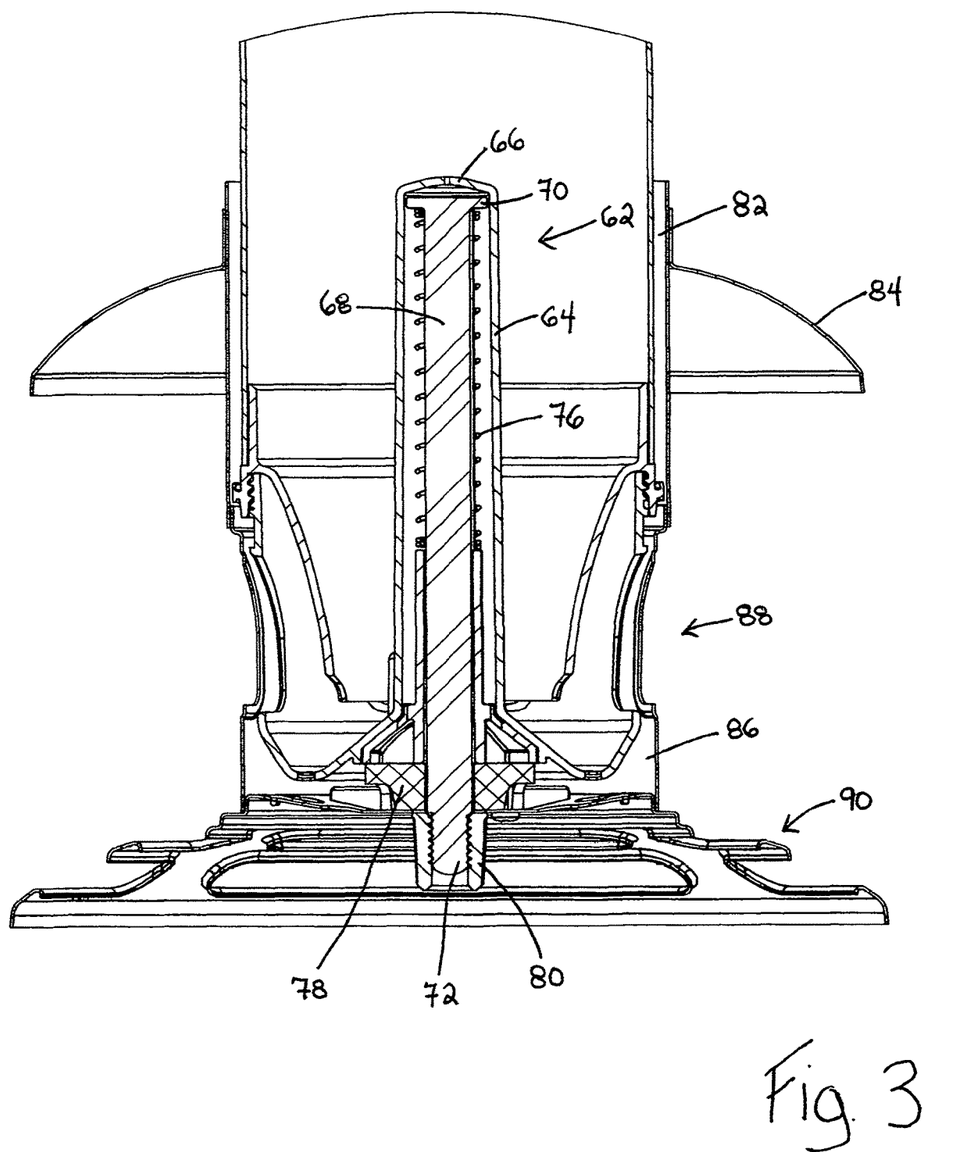
FIG. 3 is a cross-sectional view of the lower portion of the bird feeder.
Figure 4:
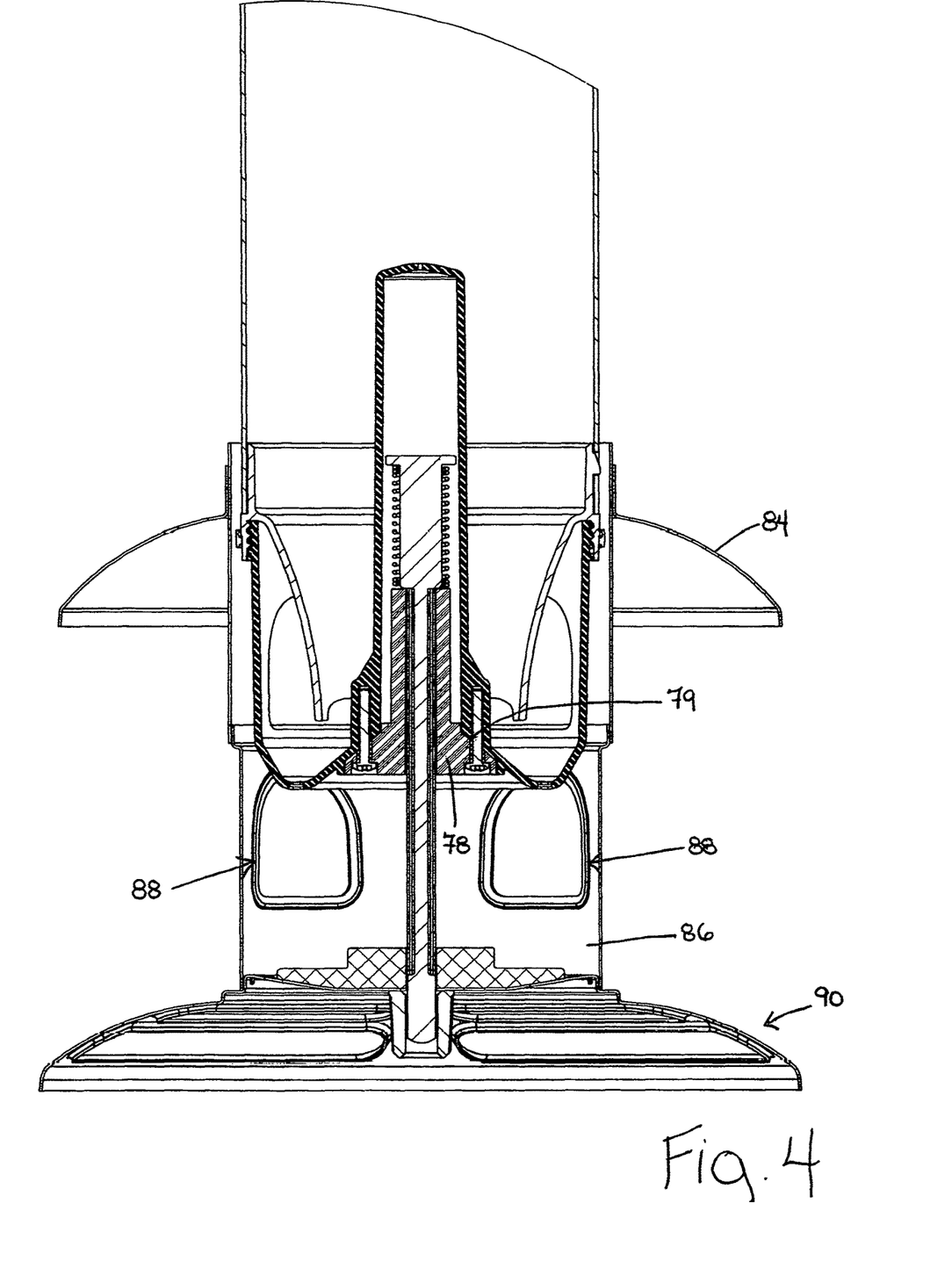
FIG. 4 is a cross-sectional view of the lower portion of the bird feeder wherein the shroud denies access to the seed.
Figure 5:
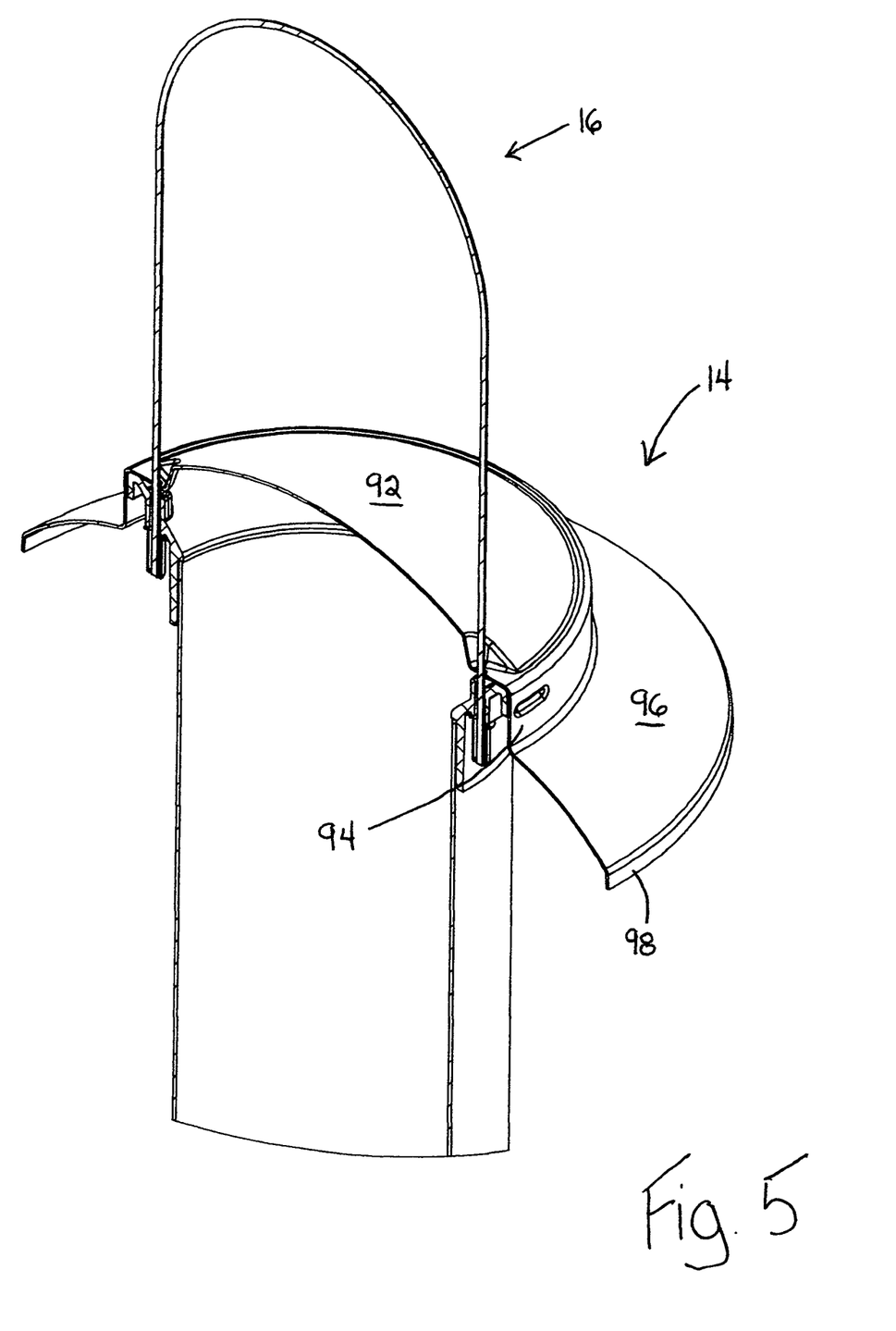
FIG. 5 is a perspective cross-sectional view of the upper portion of the bird feeder.
Figure 6:
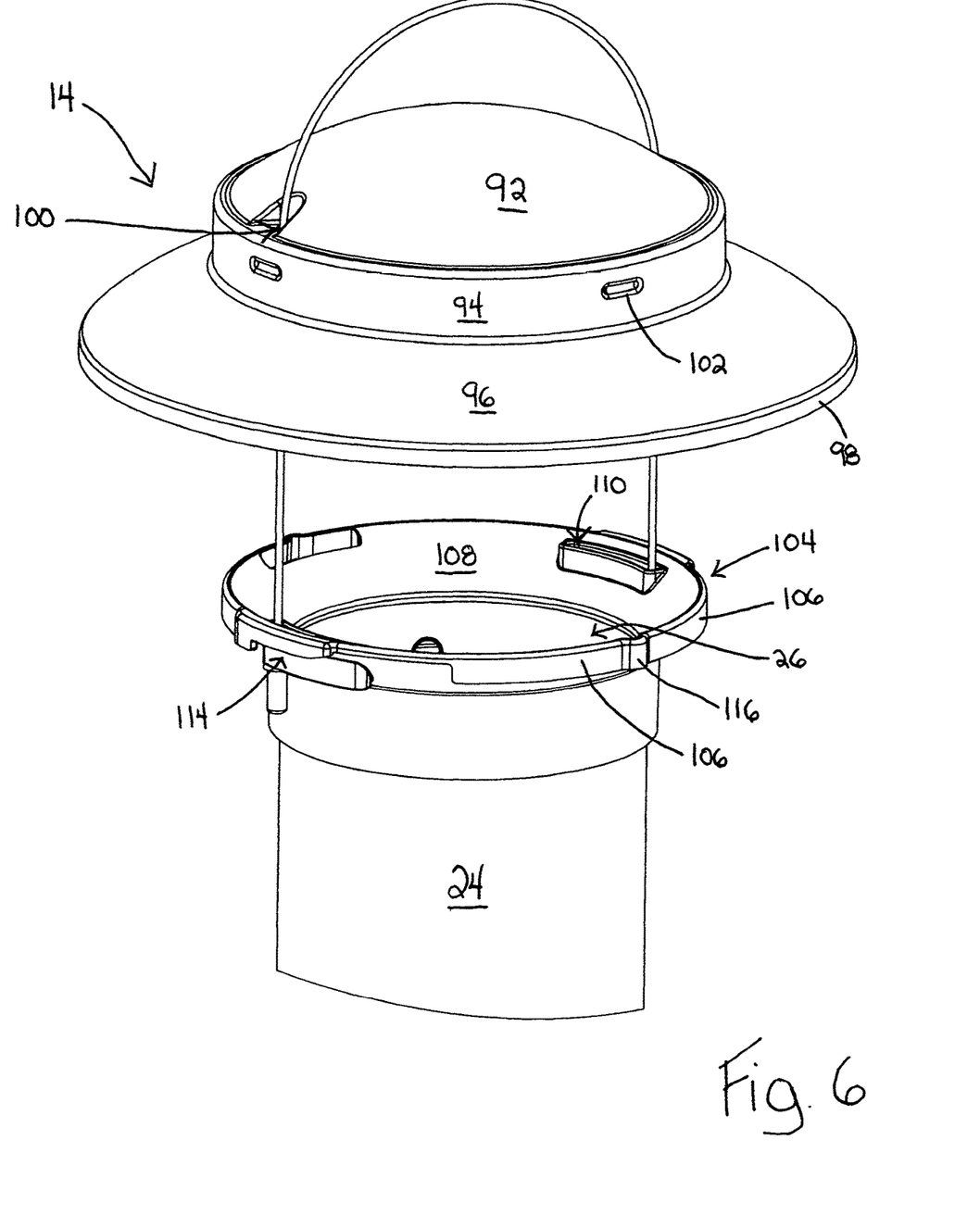
FIG. 6 is a perspective view of the upper portion of the bird feeder when the cover is in a raised position.
Figure 7:
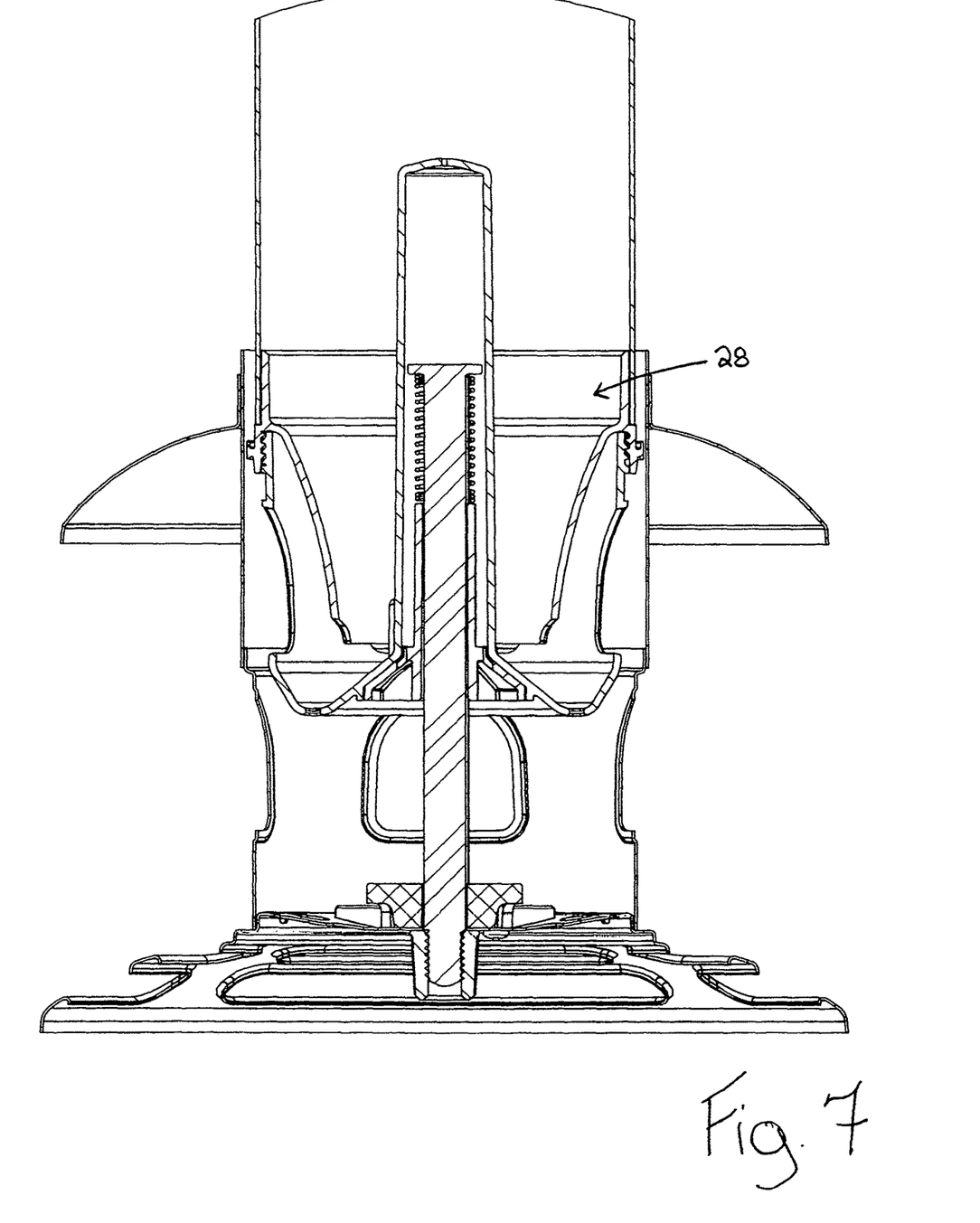
FIG. 7 is a cross-sectional view of the bottom portion of the bird feeder when the shroud is in a position to deny access to the seed container.
Figure 8:
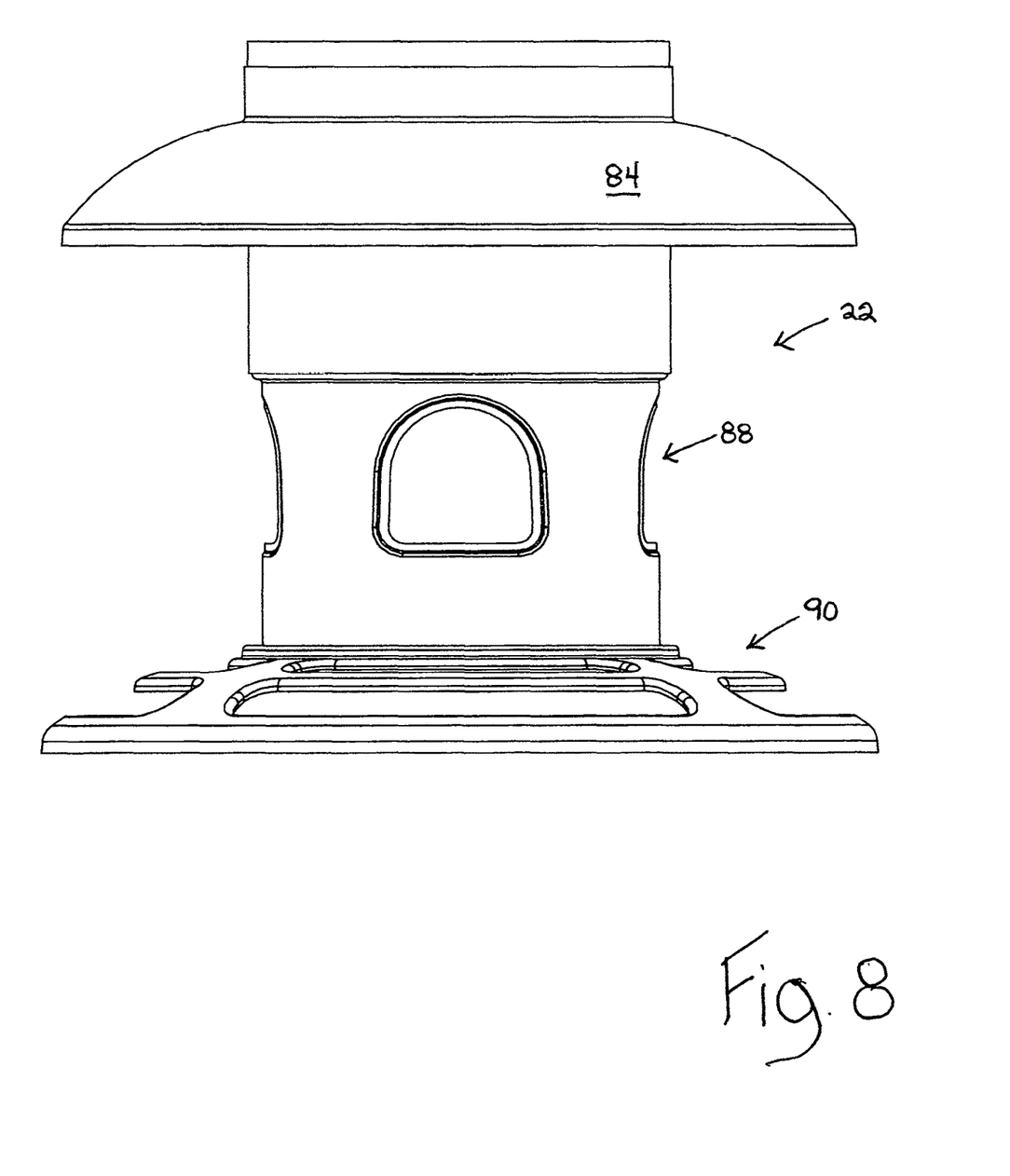
FIG. 8 is a side elevational view of the bottom portion of the bird feeder.
Figure 9:
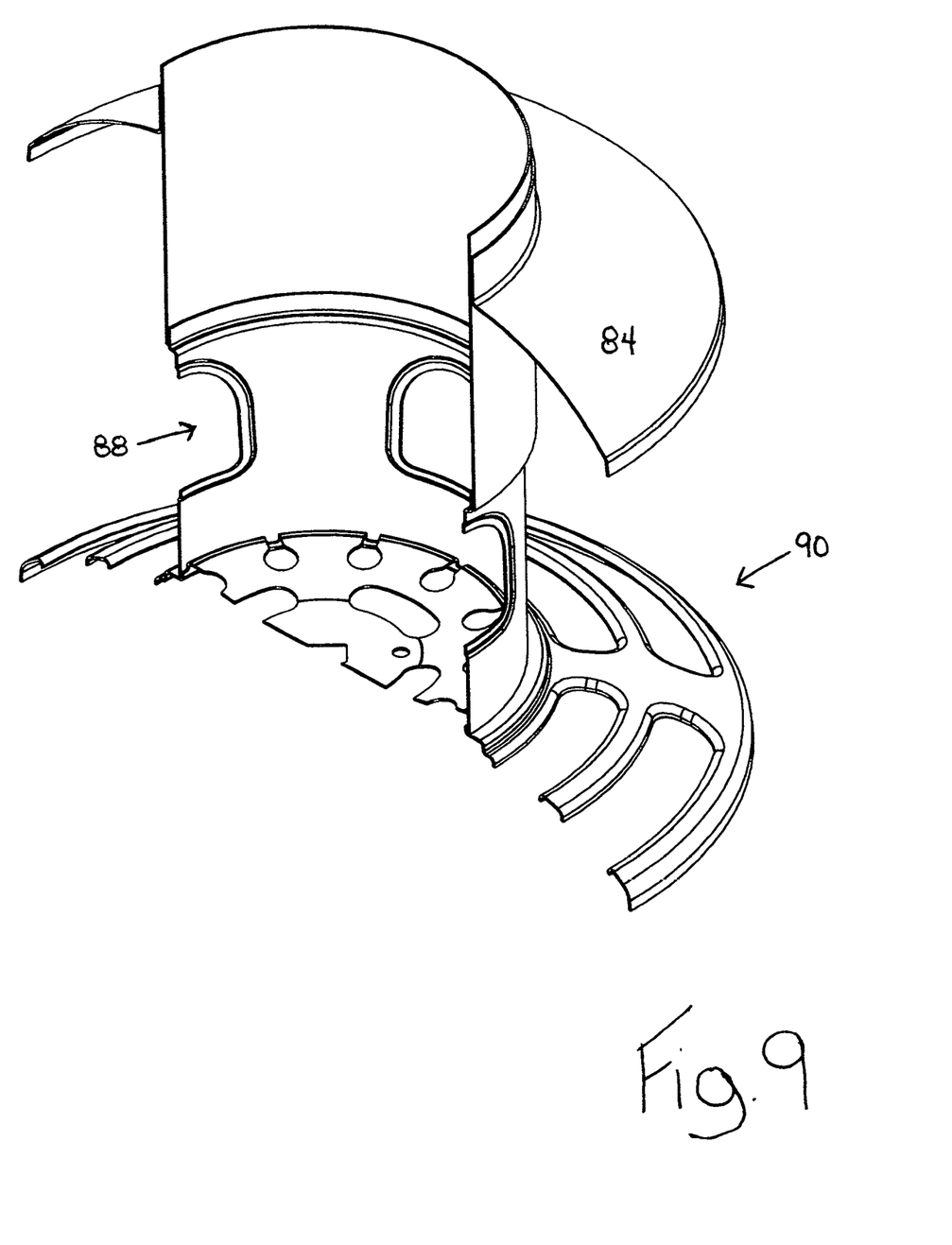
FIG. 9 is a perspective cross-sectional view of the bottom portion of the bird feeder.

Shroud 22 also includes a base perch portion 90 which permits the birds to sit thereon and access the seed in seed tube 12. However, when an excess weight is placed on shroud 22, the shroud will descend compressing coil spring 76 as shown in FIG. 4. At this point in time, access is no longer permitted to the seed.

Bird feeder 10 also includes a cover 14 which has a top dome wall 92 and a side wall 94. There is provided an outwardly flared wall 96 which terminates in a drip edge 98.

Cover 14 includes a pair of apertures 100 in top wall 92 to permit hanger 16 to pass therethrough. Protrusions 102 on the inner surface of cover side wall 94 are used to lock cover 14 in position as will be described hereinbelow.

Mounted around open top 26 of seed tube 12 is a top ring 104. Top ring 104 includes a cylindrical side wall 106 and an inwardly and diagonally extending upper wall 108. A pair of slots 110 are formed therein to receive hanger 16.

Top ring 104 is provided with recesses 114 which engage with protrusions 102 to lock the cover to the top ring 104. In turn, there are provided protrusions 116 on cylindrical side wall 106 which will engage above protrusions 102 to further lock the cover in position.

It will be understood that the above described embodiment is for purposes of illustration only and that changes and modifications may be made thereto without departing from the spirit and scope of the invention.

I claim:

1. A bird feeder comprising:
    a seed tube, said seed tube having:
        an open top end; and,
        an open lowermost end;
    a cover arranged to sit on top of said open top end of said seed tube, said cover being removably attached to said seed tube;
    a seed tube base removably attached to said open lowermost end, said seed tube base having:
        a bottom wall;
        a circular side wall having an upper portion; and,
        a plurality of feed openings in said circular side wall;
    a shroud extending around said seed tube base, said shroud having shroud feed openings therein, said shroud feed openings being normally aligned with said feed openings in said circular side wall of said seed tube base, said shroud moving to a position wherein said shroud feed openings and said feed openings in said circular side wall of said seed tube base are out of alignment when a weight above a predetermined amount is present on said shroud,
    wherein the upper portion of the circular side wall of the seed tube base is screwthreadedly engaged with the open lowermost end of the seed tube,
    and wherein the seed tube base is configured to rotate with respect to the open lowermost end of the seed tube while the cover is attached to the open top end of the seed tube.

2. The bird feeder of claim 1 further including a funnel member secured to said seed tube open lowermost end, said seed tube open lowermost end being screwthreadedly engaged with said funnel member.

3. The bird feeder of claim 1 wherein said seed tube base includes drainage apertures in said bottom wall.

4. The bird feeder of claim 1 wherein said shroud includes a baffle extending about and secured to said shroud, said baffle being located above said shroud feed openings.

5. The bird feeder of claim 1 wherein said seed tube base includes a deflector located above said feed openings in said circular side wall, said deflector being designed to deflect water flowing down said seed tube to a location intermediate said feed openings.

6. The bird feeder of claim 1 wherein said shroud includes a plurality of perch members located below said shroud feed openings.

7. The bird feeder of claim 1 further including a hanger, said hanger being connected to said cover.

8. The bird feeder of claim 1 wherein said bird feeder includes a top ring, said top ring being secured to said open top end of said seed tube, said cover being removably secured to said top ring.

\* \* \* \* \*